US010693296B2

(12) United States Patent
Arar et al.

(10) Patent No.: US 10,693,296 B2
(45) Date of Patent: Jun. 23, 2020

(54) STABILIZING CONSUMER ENERGY DEMAND

(71) Applicant: International Business Machines Corporation, Armonk, NY (US)

(72) Inventors: Raphael I. Arar, Santa Cruz, CA (US); Sandeep Gopisetty, Morgan Hill, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/586,145

(22) Filed: May 3, 2017

(65) Prior Publication Data

US 2018/0323643 A1     Nov. 8, 2018

(51) Int. Cl.
| | |
|---|---|
| *H02J 13/00* | (2006.01) |
| *G05B 15/02* | (2006.01) |
| *H02J 3/14* | (2006.01) |
| *H02J 7/35* | (2006.01) |
| *H02J 3/32* | (2006.01) |

(52) U.S. Cl.
CPC ............... *H02J 3/14* (2013.01); *H02J 3/32* (2013.01); *H02J 7/35* (2013.01); *H02J 2310/14* (2020.01)

(58) Field of Classification Search
None
See application file for complete search history.

(56) References Cited

U.S. PATENT DOCUMENTS

| | | | | |
|---|---|---|---|---|
| 4,032,072 A | * | 6/1977 | McElhoe | B05B 15/50 239/11 |
| 4,256,133 A | * | 3/1981 | Coward | A01G 25/16 137/624.11 |

(Continued)

FOREIGN PATENT DOCUMENTS

DE     102009040090 A1     3/2011

OTHER PUBLICATIONS

Liu et al., "Markov-Decision-Process-Assisted Consumer Scheduling in a Networked Smart Grid," IEEE Access, Mar. 15, 2017, pp. 2448-2458.

(Continued)

*Primary Examiner* — Ramesh B Patel
(74) *Attorney, Agent, or Firm* — Zilka-Kotab, P.C.

(57) ABSTRACT

A computer-implemented method, according to one embodiment, includes: setting a target power demand corresponding to a consumer, and performing a process. The process includes: determining an actual power demand presented to the utility by the consumer based on a reward table, determining a current error, determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Determining the actual power demand includes measuring the power demand over a period of time in accordance with a process for measuring stability of power demand received from the utility.

20 Claims, 6 Drawing Sheets

(56) References Cited

U.S. PATENT DOCUMENTS

| | | | | |
|---|---|---|---|---|
| 4,646,224 | A * | 2/1987 | Ransburg | A01G 25/16 137/624.18 |
| 5,048,755 | A * | 9/1991 | Dodds | A01G 25/16 137/78.2 |
| 5,465,904 | A * | 11/1995 | Vaello | A01G 25/16 239/69 |
| 5,479,338 | A * | 12/1995 | Ericksen | A01G 25/16 137/624.2 |
| 5,661,349 | A * | 8/1997 | Luck | A01G 25/16 307/130 |
| 6,220,293 | B1 * | 4/2001 | Rashidi | A01G 25/16 137/624.12 |
| 6,453,215 | B1 * | 9/2002 | Lavoie | A01G 25/16 137/624.11 |
| 6,490,505 | B1 * | 12/2002 | Simon | A01G 25/165 137/624.11 |
| 6,507,775 | B1 * | 1/2003 | Simon | A01G 25/16 137/624.11 |
| 6,694,223 | B1 * | 2/2004 | Goldberg | A01G 25/165 137/624.11 |
| 7,339,957 | B2 * | 3/2008 | Hitt | A01G 25/167 370/280 |
| 7,406,364 | B2 | 7/2008 | Andren et al. | |
| 7,526,365 | B1 * | 4/2009 | Frerich | A01G 25/00 137/624.13 |
| 8,682,497 | B2 | 3/2014 | Thomas et al. | |
| 8,751,036 | B2 | 6/2014 | Darden, II et al. | |
| 8,892,264 | B2 | 11/2014 | Steven et al. | |
| 9,031,703 | B2 | 5/2015 | Nakamura et al. | |
| 9,049,821 | B1 * | 6/2015 | Hanna | A01G 25/16 |
| 9,059,929 | B2 | 6/2015 | Sudhaakar et al. | |
| 9,146,548 | B2 | 9/2015 | Chambers et al. | |
| 9,331,499 | B2 * | 5/2016 | Ikriannikov | H02J 1/10 |
| 9,461,546 | B2 | 10/2016 | Freeman et al. | |
| 9,569,804 | B2 | 2/2017 | Stein et al. | |
| 10,031,503 | B2 | 7/2018 | Matsumoto | |
| 10,338,622 | B2 | 7/2019 | Nakasone | |
| 2003/0179102 | A1 | 9/2003 | Barnes | A01G 25/167 340/870.07 |
| 2007/0044978 | A1 * | 3/2007 | Cohen | A01G 25/167 169/5 |
| 2010/0191854 | A1 * | 7/2010 | Isci | G06F 1/3203 709/226 |
| 2010/0292856 | A1 * | 11/2010 | Fujita | G06Q 10/04 700/291 |
| 2011/0080044 | A1 | 4/2011 | Schmiegel | |
| 2012/0046798 | A1 | 2/2012 | Orthlieb et al. | |
| 2013/0124883 | A1 | 5/2013 | Addepalli et al. | |
| 2013/0173075 | A1 * | 7/2013 | Mitsumoto | H02J 3/00 700/291 |
| 2014/0222225 | A1 | 8/2014 | Rouse et al. | |
| 2015/0164008 | A1 * | 6/2015 | Ferrer Herrera | A01G 25/16 251/129.04 |
| 2015/0167861 | A1 * | 6/2015 | Ferrer Herrera | F16K 37/0041 239/73 |
| 2016/0202682 | A1 | 7/2016 | Matsumoto | |
| 2016/0209857 | A1 | 7/2016 | Nakasone | |
| 2016/0315472 | A1 | 10/2016 | McCullough et al. | |
| 2017/0146574 | A1 * | 5/2017 | Kuroda | H02J 3/16 |
| 2017/0353033 | A1 * | 12/2017 | Kuroda | H02J 3/24 |
| 2020/0006943 | A1 | 1/2020 | Strong, Jr. et al. | |
| 2020/0059096 | A1 | 2/2020 | Arar et al. | |

OTHER PUBLICATIONS

Rocky Mountain Institute, "Demand Response: An Introduction," Apr. 30, 2006, 46 pages retrieved from http://large.stanford.edu/courses/2014/ph240/lin2/docs/2440_doc_1.pdf.

Goldman et al., "Coordination of Energy Efficiency and Demand Response," Ernest Orlando Lawrence Berkeley National Laboratory, Jan. 2010, 74 pages.

Davito et al., "The Smart Grid and the Promise of Demand-side Management," McKinsey on Smart Grid, 2010, pp. 38-44.

Pruggler et al., "Storage and Demand Side Management as power generator's strategic instruments to influence demand and prices," Energy, vol. 36, 2011, pp. 6308-6317.

Akasiadis et al., "Stochastic Filtering Methods for Predicting Agent Performance in the Smart Grid," ECAI Proceedings of the Twenty-first European Conference on Artificial Intelligence, 2014, pp. 1205-1206.

Kota et al., "Cooperatives for Demand Side Management," ECAI'12 Proceedings of the 20th European Conference on Artificial Intelligence, 2012, 6 pages.

Veit et al., "Multiagent Coordination for Energy Consumption Scheduling in Consumer Cooperatives," Proceedings of the Twenty-Seventh AAAI Conference on Artificial Intelligence, Jul. 2013, pp. 1362-1368.

Norford et al., "Non-intrusive electrical load monitoring in commercial buildings based on steady-state and transient load-detection algorithms," Energy and Buildings, vol. 24, 1996, pp. 51-64.

Zoha et al., "Non-Intrusive Load Monitoring Approaches for Disaggregated Energy Sensing: A Survey," Sensors, vol. 12, 2012, pp. 16838-16866.

Jiang et al., "Power Load Event Detection and Classification Based on Edge Symbol Analysis and Support VectorMachine," Applied Computational Intelligence and Soft Computing, Hindawi Publishing Corporation, 2012, pp. 1-10.

Meehan et al., "An Efficient, Scalable Time-Frequency Method for Tracking Energy Usage of Domestic Appliances Using a Two-Step Classification Algorithm," Energies, vol. 7, 2014, pp. 7041-7066.

Deign, J., "Study: flow batteries beat lithium ion," Energy Storage Report, Jul. 19, 2017, 6 pages retrived from http://energystoragereport.info/study-flow-batteries-beat-lithium-ion/.

Deign, J., "The second-life threat to non-lithium batteries," Energy Storage Report, Sep. 4, 2016, 7 pages retrieved from http://energystoragereport.info/the-second-life-threat-to-non-lithium-batteries/#more-4199.

Nadel, S., "Utility Demand-Side Management Experience and Potential—A Critical Review," Annual Review of Energy and the Environment, vol. 17:507-35, 1992, pp. 507-535.

Qureshi et al., "Impact of energy storage in buildings on electricity demand side management," Energy Conversion and Management, vol. 52, 2011, pp. 2110-2120.

Strong et al, U.S. Appl. No. 16/025,988, filed Jul. 2, 2018.

List of IBM Patents or Patent Applications Treated As Related.

Chippa et al., "Scalable Effort Hardware Design: Exploiting Algorithmic Resilience for Energy Efficiency," Proceeding of the 47th Design Automation Conference, ACM, 2010, pp. 555-560.

Batool et al., "Self-Organized Power Consumption Approximation in the Internet of Things," Consumer Electronics (ICCE), IEEE International Conference, 2015, pp. 338-339.

Sahana et al., "Home Energy Management Leveraging Open IoT Protocol Stack," IEEE Recent Advances in Intelligent Computational Systems (RAICS), 2015, pp. 370-375.

Gubbi et al., "Internet of Things (IoT): A Vision, Architectural Elements, and Future Directions," Future Generation Computer Systems 29.7, Jan. 19, 2013.

Yang et al., "An Intelligent Energy Management Scheme with Monitoring and Scheduling Approach for IoT Applications in Smart Home." 2015 Third International Conference on Robot, Vision and Signal Processing (RVSP). IEEE, 2015, pp. 216-219.

Arar et al., U.S. Appl. No. 16/661,893, filed Oct. 23, 2019.

Non-Final Office Action from U.S. Appl. No. 16/025,988, dated Dec. 11, 2019.

Notice of Allowance from U.S. Appl. No. 16/025,988, dated Mar. 27, 2020.

* cited by examiner

STABILIZING CONSUMER ENERGY DEMAND

BACKGROUND

The present invention relates to energy, and more specifically, this invention relates to stabilizing energy demand from a utility.

Electric utilities include companies in the electric power industry which engage in electrical energy generation and/or distribution of electrical energy, where "energy" is the capacity to do work, while "power" is the rate of producing or consuming energy. Moreover, electrical energy is distributed across electrical energy distribution systems, or "grids", which include interconnected networks for delivering electricity from the utilities to consumers.

Advances in renewable energy and Internet of things (IoT) compatible devices have led to greater levels of granularity in terms of assessing the amount of power demanded by consumers from an energy grid. Although conventional analytics provide information which informs both consumers and utility companies how to forecast power consumption, the volatility of demand from individual consumers presents a significant problem to the conventional infrastructure of a utility company. In fact, it is generally more difficult for a typical electrical utility to handle a volatile energy demand than it is to handle an energy demand that is higher than the average of the volatile energy demand but also relatively stable. Moreover, it is greatly undesirable for utility companies to make a significant investment to upgrade their technologies in an attempt to overcome this issue without any assurance of achieving improvements.

SUMMARY

A computer-implemented method, according to one embodiment, includes: setting a target power demand corresponding to a consumer, and performing a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

A computer program product, according to another embodiment, includes a computer readable storage medium having program instructions embodied therewith, wherein the computer readable storage medium is not a transitory signal per se, the program instructions readable and/or executable by a processor to cause the processor to perform a method. The method includes: setting, by the processor, a target power demand corresponding to a consumer; and performing, by the processor, a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

A system, according to yet another embodiment, includes: a processor; and logic integrated with the processor, executable by the processor, or integrated with and executable by the processor, the logic being configured to: set a target power demand corresponding to a consumer, and perform a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

Other aspects and embodiments of the present invention will become apparent from the following detailed description, which, when taken in conjunction with the drawings, illustrate by way of example the principles of the invention.

DETAILED DESCRIPTION

Figure 1:
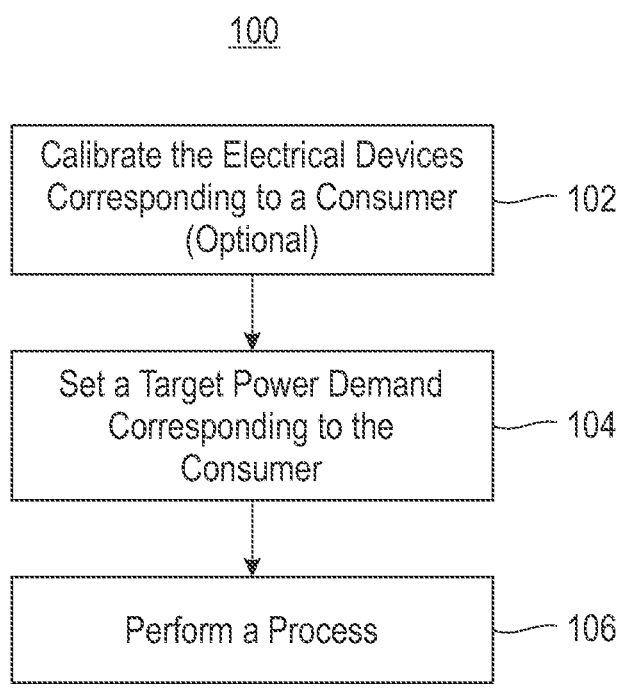
FIG. 1 is a flowchart of a method, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing and stabilizing energy demand at a consumer location. Moreover, this stabilization of energy consumption (power demand) may be achieved without implementing control of individual consumer locations by a utility.

In one general embodiment, a computer-implemented method includes: setting a target power demand corresponding to a consumer, and performing a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

The utility may for example announce that stability would be determined every month by the difference between a peak power demand and an average power demand, corresponding to the consumer, as measured by the utility. The utility may also announce that measurements of power demand corresponding to the consumer would be performed every two minutes during the month, the power demand being based on measured energy consumed within the two minute period. The utility may further announce that a stability corresponding to a difference between peak and average power of less than twenty-five percent of the average would correspond to a twenty percent discount in monthly fees as a reward to the consumer. In a preferred embodiment, a computer implemented method includes setting a target demand based on the predicted total energy consumption for the next month. The preferred embodiment may also include measuring the current power demand corresponding to the consumer every two minutes. If instead, the utility bases the reward on the difference between peak and minimum demand, the preferred embodiment may be substantially the same as in the example above because the embodiment is designed to minimize both differences. The preferred embodiment may change in a corresponding way in response to the utility announcing that stability is measured every two months, or that power demand measurements are taken every five minutes.

In another general embodiment, a computer program product includes a computer readable storage medium having program instructions embodied therewith, wherein the computer readable storage medium is not a transitory signal per se, the program instructions readable and/or executable by a processor to cause the processor to perform a method. The method includes: setting, by the processor, a target power demand corresponding to a consumer; and performing, by the processor, a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

In yet another general embodiment, a system includes: a processor; and logic integrated with the processor, executable by the processor, or integrated with and executable by the processor, the logic being configured to: set a target power demand corresponding to a consumer, and perform a process. Setting the target power demand is based on a reward table for rewarding stability of power demand, and the reward table is received from a utility. The process includes: determining an actual power demand presented to the utility by the consumer, and determining a current error, the current error being the difference between the actual power demand and the target power demand. The process also includes determining whether the actual power demand is adjustable in a direction that reduces the current error, reducing the current error by adjusting the actual power demand in response to determining that the actual power demand is adjustable in the direction that reduces the current error, and modifying the target power demand in response to determining that the actual power demand is not adjustable in the direction that reduces the current error. Moreover, determining the actual power demand includes measuring the power demand over a period of time in accordance with a process for measuring stability of power demand received from the utility.

As previously mentioned, advances in renewable energy and IoT compatible devices have led to greater levels of granularity in terms of assessing the amount of power demanded by consumers from an energy grid. However, the volatility of demand from individual consumers presents a significant problem to the conventional infrastructure of utility companies. In fact, it is generally more difficult for a typical electrical utility to handle a volatile energy demand than it is to handle an energy demand that is higher than the average of the volatile energy demand but also relatively stable. While IoT devices provide some insight into energy consumption, utility companies do not have the ability to estimate energy consumption for various consumers. Moreover, it is greatly undesirable for utility companies to make a significant investment to upgrade their technologies in an attempt to overcome this issue without any assurance of success. It follows that the ability to stabilize the energy demands imposed by consumers on an electrical grid is desired.

In sharp contrast to the foregoing shortcomings of conventional energy grids, various embodiments included herein introduce the process of incentivizing consumers to stabilize their energy demands over time. While minimizing the total consumer demand for energy has been implemented by controlling the demand schedules of multiple consumers, the ability to stabilize energy demands on the individual consumer level has not yet been achieved. By stabilizing energy demands imposed by consumers on an electrical grid, a utility may thereby be able to satisfy even larger consumer demands and/or even prevent power outages from occurring. According to various approaches, this may be achieved by implementing an electrical system which includes independent energy sources, intelligent battery charging components and/or a controlled electrically-consumed system of IoT devices, while also being electrically coupled to a utility in order supplement energy consumption, e.g., as will be described in further detail below.

Now referring to FIG. 1, a flowchart of a computer-implemented method 100 for managing and stabilizing the demand for power presented to a utility by a consumer, is shown according to one embodiment. The method 100 may be performed in accordance with the present invention in any of the environments depicted in FIGS. 1-2, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, method 100 includes calibrating the electrical devices corresponding to a consumer. See optional operation 102. Moreover, operation 104 includes setting a target power demand (energy consumption) corresponding to the consumer. According to the present description, a "consumer" may include a single residential household, a commercial office building, an individual electrically powered component (e.g., a super chiller), more than one residential household, etc., coupled to an electrical grid which includes interconnected wired and/or wireless systems for delivering electricity from the utilities to consumers. In other words, any desired number of components powered by electrical energy may be considered as a "consumer", e.g., depending on the desired embodiment.

Thus, optional operation 102 may include calibrating some or all electrical devices plugged into electrical outlets in a residential household, while operation 104 includes setting a target power demand for the residential household as a whole according to one embodiment which is in no way intended to limit the invention. It follows that in some approaches, the target power demand for a consumer may be set based at least in part on the calibration performed on the electrical devices corresponding to the consumer, as will soon become apparent.

As mentioned above, FIG. 1 includes a method 100 for managing and stabilizing the demand for power presented to a utility by a consumer. According to preferred approaches, stabilizing the demand includes keeping a peak demand close to an average demand. Thus, the target power demand is preferably selected based on an average power demand that is anticipated for that consumer. In doing so, the target power demand may be desirably close to the actual power demand of the consumer in real time. According to various approaches, anticipated power demands for a consumer may be determined differently. In some approaches, the power demands corresponding to a consumer may be averaged over the previous week, where the average power demand is set as the target power demand for that consumer. In other approaches, electrical devices (profiled IoT devices and/or non-IoT devices) at a given consumer location may communicate with a central processing unit used to perform the calibration and/or determine the target power demand. In other approaches, forecasted environmental conditions such as temperature, humidity, wind speeds, etc. may be used to calculate an anticipated power demand for a given consumer, e.g., based on previously collected data. In still other approaches, planned consumer events, availability of resources, actual (e.g., real-time) energy consumption, a number of electrical devices coupled to the electrical grid at a consumer location, etc., may be used to determine (e.g., calculate) the target power demand set for a given consumer.

In some approaches, the process of selecting and/or setting the target power demand may be based at least in part on a reward table (e.g., a lookup table). The reward table may be received from the utility and may outline a system for rewarding stability of power demanded by a consumer and consequently placed on the utility. The reward table may be stored in memory at the consumer location, accessed by the consumer at a designated location (e.g., a Uniform Resource Locator (URL)), provided to the consumer upon request, etc. Moreover, the reward table may be predetermined, updated over time, adjusted in real-time, replaced with an alternative system of determining selecting and/or setting a target power demand, etc., according to various approaches.

Method 100 further includes performing a process. See operation 106. Depending on the approach, the process may be performed more than once, e.g., periodically, upon receiving user input, preconfigured settings, depending on a result of the process, etc. It should be noted that "periodically" as used herein may include every second, several seconds, minute, two or more minutes, hour, two or more hours, day, week, month, etc., or any other desired frequency of reoccurring intervals.

Figure 2:
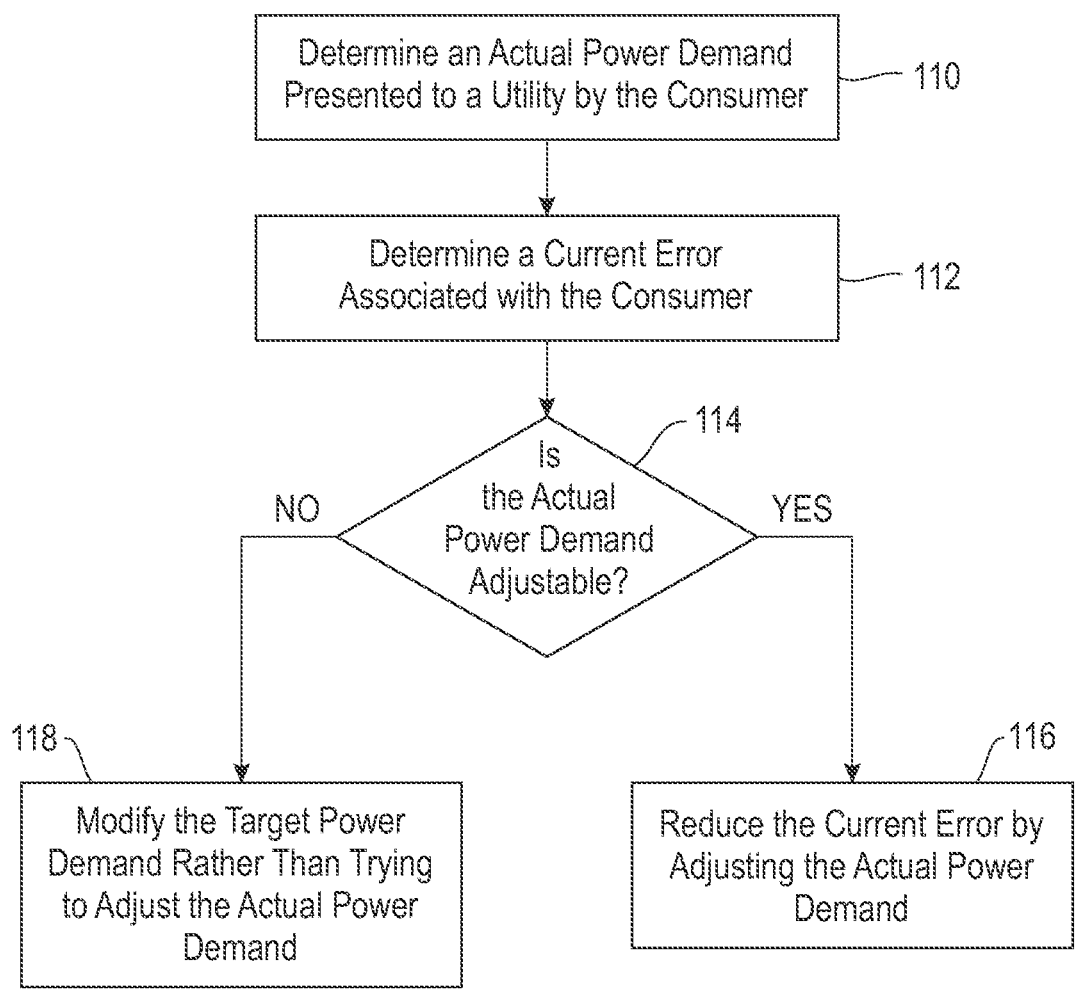
FIG. 2 is a flowchart of sub-operations of the method in FIG. 1, in accordance with one embodiment.

Looking now to FIG. 2, exemplary sub-operations are illustrated in accordance with one embodiment, one or more of which may be used to perform operation 106 of FIG. 1.

However, it should be noted that the sub-operations of FIG. 2 are illustrated in accordance with one embodiment which is in no way intended to limit the invention.

As shown, sub-operation 110 includes determining an actual power demand presented to a utility by the consumer. As mentioned above, although a target power demand is set in operation 104 of FIG. 1, the actual power demand corresponding to the consumer may be different depending on the situation. The actual power demand presented to the utility by the consumer may be determined by reading a power meter corresponding to the consumer, calculating how much power is channeled to the consumer via an electrical energy grid, etc. According to some approaches, a specified process for measuring the stability of power demand may be received from the utility. Therefore, determining the actual power demand may include measuring the power demand over a period of time in accordance with the specified process of measuring the stability of power demand received from the utility. Specific examples of determining (e.g., measuring) power demand stability are presented below.

Once the actual power demand has been determined, sub-operation 112 includes determining a current error associated with the consumer. The current error is the difference between the actual power demand and the target power demand. As previously mentioned, although a target power demand has been set, it is only a target. The actual power demand corresponding to the consumer may differ from the target power demand depending on the situation. In other words, the amount of energy actually used by a consumer may be different than an anticipated target depending on various factors. For example, a consumer may unexpectedly attempt to quickly charge one or more batteries of such devices as an electric vehicle which may place a significant and unanticipated load on the electrical grid. As a result, the consumer's actual power demand may rise above a corresponding target power demand, thereby increasing the current error associated with the consumer.

Increases in the current error associated with a consumer are undesirable as fluctuations in actual power demands away from respective target power demands result in undesirable strain on a utility. Again, it is generally more difficult for a typical electrical utility to handle a volatile energy demand than it is to handle an energy demand that is higher than the average of the volatile energy demand but also relatively stable. Thus, it may be desirable that the actual power demand is adjusted such that it is closer to the target power demand. Accordingly, decision 114 includes determining whether the actual power demand is adjustable, e.g., in a direction which would cause the current error to be reduced. Whether the actual power demand is adjustable may be determined by evaluating specifications and/or settings of each of the electrical devices causing the actual power demand. Specifications and/or settings of the electrical devices which may be evaluated include, but are not limited to, lower/upper limits to the length of period in which the electrical device may be repeatedly cycled on and off, lower/upper limits of the percentage of on state time, a range of alternating current frequencies which the electrical device may function at, limits sufficient to allow the electrical device to function without significant harm to the electrical device or its purpose, etc.

As shown, the flowchart proceeds to sub-operation 116 in response to determining that the actual power demand is adjustable, preferably in a direction that reduces the current error. Accordingly, sub-operation 116 includes reducing the current error by adjusting the actual power demand. The direction in which the actual power demand is adjusted depends on whether the actual power demand is above or below the target power demand. In other words, reducing the current error may include decreasing the current power demand in situations where the current power demand is above the target power demand, or alternatively increasing the current power demand in situations where the current power demand is below the target power demand. Exemplary operations which may be implemented for adjusting the actual power demand are described in further detail below with reference to FIG. 3.

However, the flowchart alternatively proceeds to sub-operation 118 in response to determining that the actual power demand is not adjustable, particularly not adjustable in a direction which would cause the current error to be reduced. As shown, sub-operation 118 includes modifying the target power demand rather than trying to adjust the actual power demand. In preferred approaches, the target power demand is modified (increased or decreased) in a direction towards the actual power demand. For example, if the actual power demand is higher than the target power demand and the actual power demand is not adjustable, the target power demand may be increased towards the actual power demand. Alternatively, if the actual power demand is lower than the target power demand and the actual power demand is not adjustable, the target power demand may be decreased towards the actual power demand. It follows that in some approaches, it may be more desirable to increase the target power demand such that a stable power demand may be maintained moving forward, than keeping a lower target power demand which is less than the actual power demand associated with a consumer.

Figure 3:
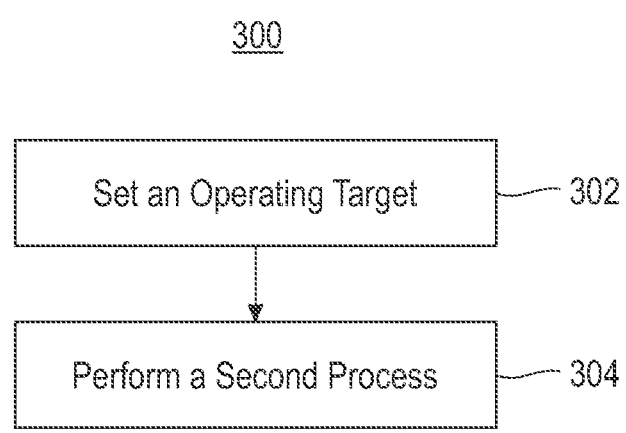
FIG. 3 is a flowchart of a method, in accordance with one embodiment.

Looking now to FIG. 3, a flowchart of a computer-implemented method 300 is shown according to one embodiment. As mentioned above, the method 300 of FIG. 3 includes exemplary operations which may be implemented for adjusting the actual power demand corresponding to a consumer (e.g., see sub-operation 116 of FIG. 2). The method 300 may be performed in accordance with the present invention in any of the environments depicted in FIGS. 1-2, among others, in various embodiments. Of course, more or less operations than those specifically described in FIG. 4 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes setting an operating target. According to preferred approaches, the operating target is set equal to a value between the actual power demand and the target power demand. Again, one or more of the operations of method 300 may be implemented to adjust the actual power demand such that it is closer to the target power demand in order to reduce a current error. Thus, by setting the operating target equal to a value between the actual power demand and the target power demand, the operating target may be used to adjust the actual power demand towards the target power demand.

In some approaches, the operating target may be selected and/or set based on the reward table received from the utility. For example, the operating target may be selected and set (e.g., implemented) based on an amount of a resulting award which may be received from the utility should the actual power demand be adjusted to reach the operating target. The operating target may also be selected and/or set based on a process for measuring stability of power demand received from the utility, e.g., as mentioned above. For instance, the operating target may be set by using the process to determine an actual power demand which would improve power demand stability.

Moreover, operation 304 includes performing a second process which may desirably reduce a current error associated with a consumer. Depending on the approach, the second process may be performed more than once, e.g., periodically, upon receiving user input, preconfigured settings, depending on a result of the second process, etc. Looking now to FIG. 4, exemplary sub-operations are illustrated in accordance with one embodiment, one or more of which may be used to perform operation 304 of FIG. 3. However, it should be noted that the sub-operations of FIG. 4 are illustrated in accordance with one embodiment which is in no way intended to limit the invention.

As shown, sub-operation 420 includes selecting an electrical device to adjust the operating performance of in order to effect the current power demand corresponding to the consumer. It follows that the selected electrical device is preferably associated with the consumer. As previously mentioned, a "consumer" may include a single residential household, a commercial office building, an individual electrically powered component (e.g., a super chiller), more than one residential household, etc., coupled to an electrical grid. Thus, any component electrically coupled to an electrical system at a consumer location may be selected in sub-operation 420. In some approaches, the electrical device selected may be based on a prediction that the electrical device will be turned on in the near future, e.g., by a user. For example, ceiling fan may be selected in response to the temperature in a room rising above a threshold in addition to the actual power demand being lower than the target power demand. According to another example, the electrical device may be selected based on a use history corresponding to a consumer. For instance, each day at 6:00 pm a consumer turns on a heater.

Decision 422 includes determining whether the actual power demand is greater than the target power demand. According to some approaches, decision 422 may be determined by using the value of the current error. Again, the current error is the difference between the actual power demand and the target power demand. Thus, if the current error value has a (e.g., is a) non-zero, negative value, it may be determined that the actual power demand is less than the target power demand. Alternatively, if the current error value is determined to have a (e.g., be a) non-zero, positive value, it may be determined that the actual power demand is greater than the target power demand. It should be noted that "negative" and "positive" are in no way intended to limit the invention, but rather have been presented by way of example. Rather than determining whether the difference between the actual power demand and the target power demand is positive or negative, equivalent determinations may be made, e.g., such as whether the difference between the target power demand and the actual power demand is negative or positive respectively.

Figure 4:
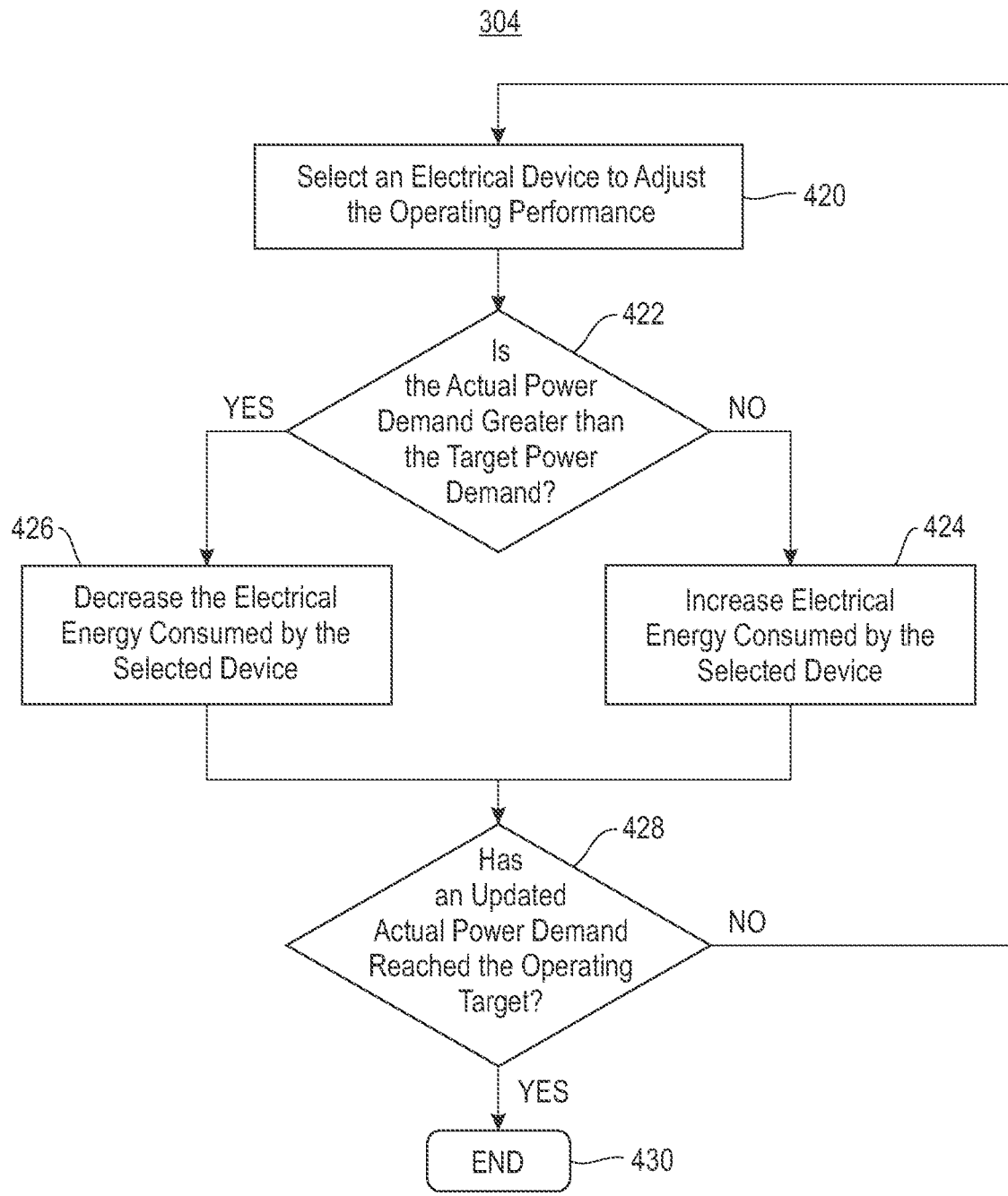
FIG. 4 is a flowchart of sub-operations of the method in FIG. 3, in accordance with one embodiment.

FIG. 4 proceeds to sub-operation 424 in response to determining that the actual power demand is not greater than the target power demand. There, sub-operation 424 includes increasing a rate of electrical energy consumption corresponding to the selected device. In other words, sub-operation 424 includes increasing the amount of electrical energy consumed by the selected device. By increasing the rate of electrical energy consumption corresponding to the selected device, sub-operation 424 preferably causes the actual power demand to increase, bringing it closer to the target power demand. This may be achieved by charging a battery (rechargeable battery), selectively switching on sockets with devices attached thereto, charging/discharging a super capacitor, etc. However, FIG. 4 proceeds to sub-operation 426 in response to determining that the actual power demand is greater than the target power demand. In sub-operation 426, the rate of electrical energy consumption corresponding to the selected device is decreased, preferably such that the actual power demand is decreased, thereby adjusting the actual power demand closer to the target power demand. In other words, sub-operation 426 includes decreasing the amount of electrical energy consumed by the selected device.

In some approaches the type of electrical device selected in sub-operation 420 may depend at least in part on the extent of the current error. For instance, approaches in which the current error is a small value (e.g., less than 10% of the target power demand) may select an electrical device which uses a relatively low amount of energy, e.g., such as a mechanical fan. However, approaches in which the current error is a large value (e.g., at least greater than 10% of the target power demand) may select an electrical device which uses a relatively high amount of energy at least compared to a low power electrical device, e.g., such as an electrical heater. The more energy an electrical device uses, the greater an adjustment may be made to the actual power demand by changing the performance of the electrical device itself.

It is also preferred that the electrical device selected in sub-operation 420 is able to withstand an adjustment to the operating performance thereof without causing damage to the electrical device itself, harming (e.g., disadvantaging) the consumer, negatively effecting other electrical devices coupled thereto, etc. For example, it may be undesirable to select the security system of a commercial office building and decrease the electrical energy consumed by the security system, as doing so may compromise the security of the building. Rather, selecting a heating, ventilation and air conditioning (HVAC) system of a commercial office building to decrease the electrical poser consumed thereby may be more desirable, as the resulting effect on the office building may only be a longer wait time before a thermostat setting is reached.

Energy consumed by the electrical devices may be changed differently depending on the desired approach. For instance, in some approaches the rate of electrical energy consumption corresponding to the selected device may be changed (increased or decreased) by adjusting a frequency of alternation for an alternating current supplied to the electrical device. According to some approaches, a nominal 60 Hz alternating current may be locally modified to deliver an alternating current with a frequency between about 55 Hz and about 65 Hz, but may be higher or lower depending on the range of frequencies a given device may successfully (e.g., safely) tolerate. It follows that this approach may only be effective for electrical devices supplied with alternating current. In other approaches, the rate of electrical energy consumption corresponding to, or at least available to, the selected device may be changed (increased or decreased) by adjusting a frequency at which the electrical device is turned on and off. In other words, the selected electrical device may repeatedly be turned on and off at a frequency which causes the amount of energy consumed by the electrical device to increase or decrease as desired. For example, the electrical energy consumed by an electrical device may be changed by creating a schedule of times when energy is available to the electrical device (e.g. the device may only receive energy during a set of pre-scheduled hours). Moreover, electrical energy consumption schedules for different devices may be adjusted to stabilize total demand in each period of time. According to an exemplary approach which is in no way intended to limit the invention, an electrical device may only receive energy 30% of each minute, but could be higher or lower.

Moreover, any other process of adjusting the energy consumed by an electrical device which would be apparent to one skilled in the art after reading the present description may be implemented. For instance, one or more of the electrical devices at a consumer location may have a corresponding energy profile which may include energy consumption in any state, tolerance (e.g., variability of energy consumption), pattern of usage, status of the device, status options, etc. these energy profiles may thereby be used by a central system to appropriately allocate energy from and/or communicate with a source of power such as a utility, a battery, a supplemental energy source, etc. depending on the situation.

Referring still to FIG. 4, decision 428 determines whether an updated actual power demand has reached (e.g., met or passed) the operating target. Again, increasing or decreasing the energy consumed by an electrical device corresponding to a consumer will have an effect on the actual power demand of the consumer as a whole. Thus, decision 428 may be used to determine whether enough of an effect on the actual power demand has been achieved (if the operating target has been reached), or if additional steps are called for. The flowchart returns to sub-operation 420 in response to determining that the updated actual power demand has not yet reached the operating target. Upon returning to sub-operation 420, the second process may be initiated and repeated such that a different electrical device is selected and adjusted accordingly. In some approaches the same electrical device may be selected again upon repeating the second process such that the energy consumed by the repeat electrical device may be increased or decreased further.

Alternatively, FIG. 4 proceeds to operation 430 in response to determining that the updated actual power demand has reached (or passed) the operating target, whereby the second process is ended. It should be noted that although not shown in FIG. 4, in some approaches decision 428 may repeatedly be performed in some embodiments without proceeding to any other operations. For instance, rapid periodic (e.g. every minute) measurements (e.g., computing derivatives) of the updated actual power demand may be made in order to ensure the error is gradually reduced, thereby preventing the method from overshooting the operating target.

Once the second process illustrated in FIG. 4 has ended, method 300 of FIG. 3 may be performed again. As previously mentioned, the operating target may be set equal to a value between the actual power demand and the target power demand. Thus, even after the operating target has been reached (e.g., met or passed), the new actual power demand may still be above or below the target power demand. The operations of FIG. 3 and the processes of FIG. 4 may repeatedly be performed as described above until a new actual power demand is equal to (or at least sufficiently close to) a pre-specified tolerance, e.g., a threshold. In some approaches the threshold value may be the target power demand itself. As a result, additional electrical devices may be selected on subsequent iterations of the processes included in FIGS. 3-4, e.g., such that adjustments to the performance characteristics of two or more electrical devices corresponding to a given consumer may both be implemented. Moreover, periodic corrections implemented at a long period (e.g., once a day, once every few days, once a week, etc.) may be performed by implementing more gradual improvements, e.g., based on the measured error and/or the pre-specified tolerance, as would be appreciated by one skilled in the art after reading the present description.

Stability in consumer power demands may also be achieved by implementing supplemental energy sources which are able to provide power in addition to the power from a utility. According to some approaches, an energy storage device may be coupled to one or more of the electrical devices at a consumer location via a wired system, the energy storage device being configured to output energy at a higher power than a low power input (at least compared to the higher power output) of the device, e.g., such as a battery. According to an illustrative example which is in no way intended to limit the invention, a 100 Ampere hour (Ah) battery may be charged by a 100 watt (W) input, but may be able to output 1200 W of power for a period of 1 hour. In other approaches, solar panel arrays, wind turbines, hydroelectric generators, gas powered generators, geothermal electric generators, etc., and/or combinations thereof may be integrated at a consumer location and electrically coupled to a wiring system that runs throughout the consumer location. In further approaches, an energy storage device may be coupled to a utility and an independent energy source which may be located locally. Accordingly, the energy storage device may be configured to accept electrical energy from the independent energy source and the utility concurrently, e.g., depending on the current amount of power demanded by the various electrical devices of the consumer.

The supplemental energy sources integrated at a consumer location may thereby be able to provide power to any one or more of the electrical devices at the consumer location which are also coupled to the wiring system. Moreover, the supplemental energy sources may also be coupled to the utility (electrical grid) via the wiring system. Accordingly, one or more supplemental energy sources may assist in stabilizing the power demand placed on the utility. This stabilization may be achieved by balancing the number of active (powered) electrical devices, the power demanded by active electrical devices, the amount of power supplied by the utility compared to the supplemental energy sources, etc. In some approaches, the process of increasing and/or decreasing the electrical energy consumed by one or more electrical devices corresponding to a consumer may include adjusting an amount of electrical energy supplied to the electrical devices by one or more supplemental energy sources, e.g., such as a solar panel array and/or an energy storage device (battery). In other approaches, reducing the current error by increasing and/or decreasing the actual power demand may include adjusting an amount of electrical energy used to charge an energy storage device (e.g., battery) included at the consumer location. This may be achieved by adjusting a rate of electrical energy supplied by one or more alternative energy sources coupled to the energy storage device, the utility, other consumers, etc., as will be described in further detail below. It follows that it may be preferred that electrical devices at a consumer location are interconnected (e.g., via IoT functionality) such that the electrical components may share information between each other, with a central controller, with an administrator, etc. Moreover, adjustments to power demands of any one or more electrical devices, the amount of power provided by the utility, the amount of power produced by one or more supplemental energy sources, etc., may be made based on this shared information.

Figure 5A:
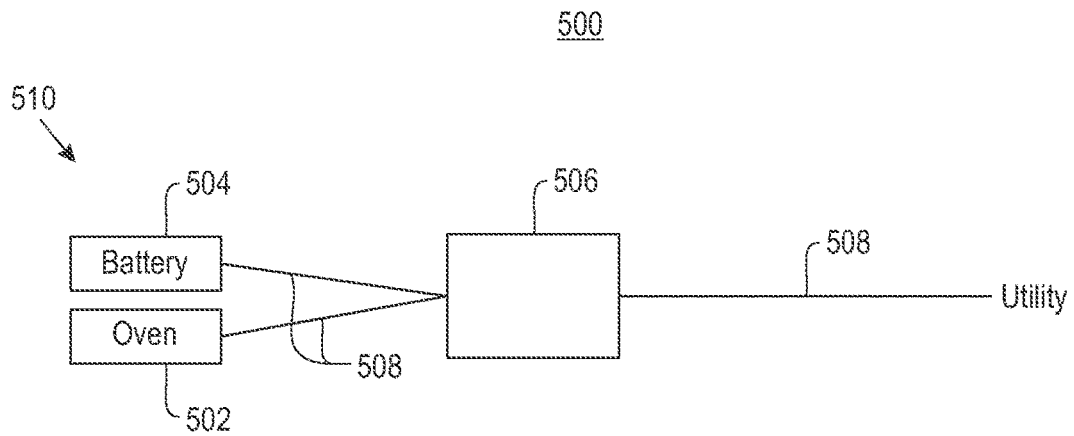
FIG. 5A is a representational diagram of a consumer location coupled to a utility, in accordance with one embodiment.
Figure 5B:
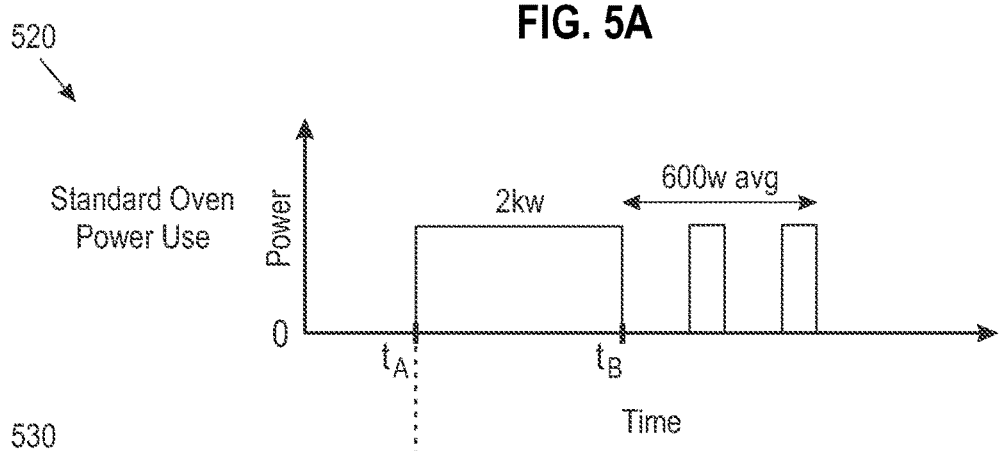
FIG. 5B is a graph plotting power v. time for conventional power usage.
Figure 5C:
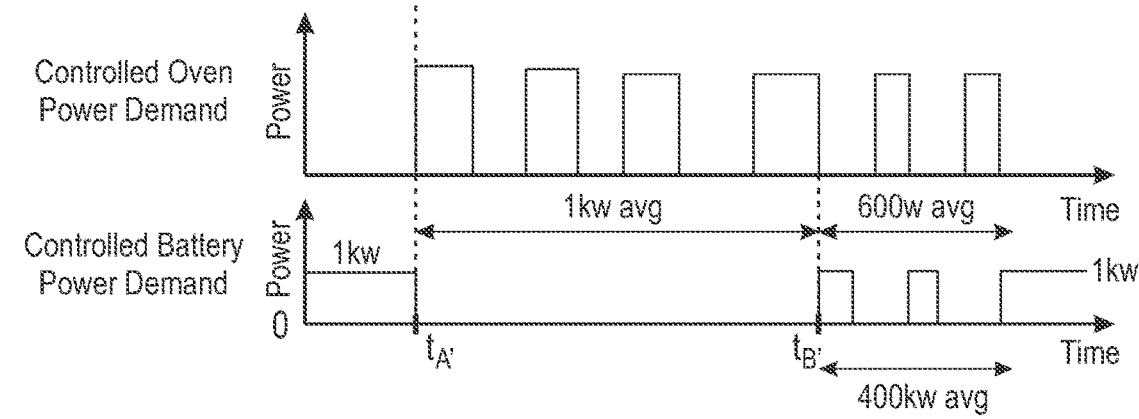
FIG. 5C is two graphs plotting power v. time for two respective electrical devices, in accordance with one embodiment.

Referring momentarily to FIGS. 5A-5C, a representational diagram 500 and corresponding power graphs 520, 530 for achieving power demand stabilization is illustrated according to one embodiment. As an option, the present diagram 500 and corresponding graphs 520, 530 may be implemented in conjunction with features from any other embodiment listed herein, such as those described with reference to the other FIGS., such as FIGS. 1-4. However, such embodiments and others presented herein may be used in various applications and/or in permutations which may or may not be specifically described in the illustrative embodiments listed herein. Further, the embodiments presented herein may be used in any desired environment. Thus FIGS. 5A-5C (and the other FIGS.) may be deemed to include any possible permutation.

As shown in FIG. 5A, the representational diagram 500 includes an oven 502 and a battery (supplemental energy source) 504, both of which are coupled to a smart switch 506 via a wired system 508. Moreover, the smart switch 506 is further coupled to a utility 510 via the wired system 508. Accordingly, electrical energy may be provided to the oven 502 from the utility 510 and/or the battery 504 depending on how the smart switch 506 pulls and diverts electrical energy therefrom.

Looking to FIG. 5B, the graph 520 illustrates the standard energy consumption of an exemplary conventional oven without any power demand stabilization implemented. The graph shows that upon being activated (being set to a given cooking temperature) at $t_A$, energy consumption spikes and an increased power demand is sustained for a long period of time while the oven is heating up. This power demand spike is placed fully on the utility. However, after the set cooking temperature has been reached at $t_B$, the oven is deactivated and activated at a rate which significantly reduces the average power demanded by the oven from the utility. As previously mentioned, this fluctuation in power demand is undesirable as it puts undue strain on the utility providing the power. Moreover, the utility is unable to anticipate spikes and drops in the power demands of a consumer, much less a multitude of consumers.

In sharp contrast, the graph 530 in FIG. 5C illustrates an exemplary effect of implementing one or more of the power demand stabilization processes included in FIGS. 1-4. According to the present example, a 1 kW target power demand is implemented. As shown, the battery 504 places a sustained power demand of 1 kW on the utility up until the point in time $t_{A'}$ that the oven 502 is activated. This 1 kW of power demanded by the battery 504 may be supplied by the utility 510 and used to charge the battery 504. Once the oven 502 is activated, the power demanded by the battery 504 reduces to 0 kW while the power demanded by the oven 502 increases such that a 1 kW average is maintained until the cooking temperature has been reached at $t_{B'}$. Once the cooking temperature has been reached, the power demanded by the oven 502 decreases to a 600 W average in order to maintain the cooking temperature and the power demanded by the battery 504 is increased to a 400 W average in order to maintain an overall 1 kW power demand on the utility.

It follows that powering an independent consumer location with an independent energy source as well as an "intelligent battery" may allow the consumer to select the amount of energy it draws at a given point in time. According to the present description, an "intelligent battery" preferably includes an electrical energy storage component which is able to understand (e.g., independently determine) an optimal rate at which it charges/discharges energy supplied by a source of electrical energy in order to maintain a stable power demand for the consumer location as a whole. This selection may be made, at least in part, by evaluating historical usage as well as communicating with a system of profiled and/or non-profiled devices. In other words, coordinating activation and/or performance of various electrical devices, a stable (e.g., about constant) power demand may desirably be achieved, thereby improving the overall performance of the utility According to an example, which is in no way intended to limit the invention, if an IoT compatible electrical device at a consumer location has knowledge of a solar panel in addition to current/historical weather data and a current power demand target corresponding to the consumer location, the IoT compatible electrical device may be able to independently select the amount of energy it draws. In other words, the IoT electrical device may communicate with the solar panel which, in turn, may communicate with a battery and/or supply utility to determine the precise flow of energy at the consumer location. Moreover, the communication between the electrical device and the solar panels may be able to cause a change in the power the solar panel is generating, e.g., by adjusting an orientation of the solar panels with respect to the current position of the sun and/or any shading. An intelligent battery may thereby be able to independently determine an optimal rate at which it charges/discharges energy supplied by the solar panel and/or utility provider, preferably in order to maintain a stable power demand for the consumer location as a whole. Energy demand may thereby be stabilized on a nuclear level at a given consumer location which may have IoT devices, independent energy sources having features which may be manipulated, an intelligent battery to store and/or distribute power, etc.

It should also be noted that any of the operations, sub-operations and/or processes included in FIGS. 1-4 may be performed by a device (e.g., a computer, processor, switch, router, processing circuit, etc.) located at any point of an electrical energy distribution system (electrical grid). For instance, in some approaches method 100 and/or 300 may be performed by a controller located at the consumer location, while in other approaches method 100 and/or 300 may be performed by a computer system located at a utility headquarters. In still other approaches, although one or more of the operations, sub-operations and/or sub-processes of FIGS. 1-4 may be performed by a utility provider, a consumer may have the ability to decide whether one or more of the operations, sub-operations and/or sub-processes are actually performed. In other words, consumers may be able to determine whether they desire to partake in an electrical energy demand stabilization scheme. Moreover, a desirable improvement to consumer privacy may be achieved, particularly compared to conventional management schemes. Again, consumers may be incentivized by a utility to implement one or more of the operations, sub-operations and/or sub-processes included in FIGS. 1-4, but may not be required to do so.

Improvements to the overall performance of a utility may be returned to the consumer in the form of a reward, e.g., as a part of an incentive program. Although an incentive program may be structured any number of ways in various approaches, according to an illustrative approach, the incentive program may be implemented by a utility company, in which consumer power demands are monitored over a first window of time. Moreover, a reward corresponding to the difference between a peak power demand and a minimum power demand (where the peak and minimum power demands are each measured over a second shorter window of time) realized during the monitoring over the first window of time, may be given to the consumer by the utility company. The reward may be correlated with the difference such that the smaller the difference between a peak power demand and a minimum power demand corresponds to a higher reward. In other words, the incentive program may increase the reward for a consumer the more stable their power demand is over a window of time. Specific values for the reward sent to a particular consumer may be stored in a reward table in memory.

According to another approach, a reward may be based on a correlation of a size of the consumer's current error (the difference between target power demand and current power demand represented by a numerical value) to a reward table over a period of time. A larger reward may correspond to situations where a size of the consumer's current error over a period of time is within a range, as compared to situations where a size of the consumer's current error is outside the range for any point during the period of time. For example, a financial reward of $X may be received by a consumer from a power utility company in response to the consumer's current power demand being within ±5% of the target power demand over the span of a week. However, the financial reward of $X may be reduced each time the consumer's current power demand is not within ±5% of the target power demand. For instance, the financial reward of $X may be reduced by $[Y×(the number of minutes the current power demand is not greater than −5% and less than 5% of the target power demand)].

According to another approach, the reward may be based on the difference between a peak measured demand and an average measured demand, or any other method for measuring stability of a demand.

It follows that in response to implementing one or more of the operations, sub-operations and/or sub-processes included in FIGS. 1-4, a consumer may receive a reward from the utility, e.g., as part of an incentive program.

Although consumers may be incentivized to maintain a constant power demand according to various embodiments described herein, in some approaches consumers may also be incentivized to maintain a power demand that is below a total amount for a given period of time. Thus, in some approaches the reward received by a consumer may be increased in response to a consumer's current error being within a range over a period of time, in addition to the overall power demand for the period of time being below a threshold.

According to an in-use example, which is in no way intended to limit the invention, a computer-implemented method includes profiled IoT electrical devices and/or non-IoT electrical devices at a consumer location communicating with a central processing unit (e.g., a controller according to any of the approaches included herein). As a result of the communicating, the central processing unit may receive information about the devices such as anticipated power demands, operating schedules, historical use data, etc. Moreover, the central processing unit may use this information to determine an amount of power to draw from a battery coupled to a wiring system at the consumer location and/or a utility which is also coupled to the wiring system. In other words, the central processing unit may begin to individually look at various electrical devices available at consumer location to determine a balance among the electrical devices and their respective tolerances. In some approaches, a central processing unit may also or alternatively query other consumers which are nearby, connected, online, etc., and determine whether energy may be received from, or routed to any one or more of the other consumers depending on current power demands. According to one example, which is in no way intended to limit the invention, a central controller may measure the stability of each individual consumer power demand in addition to evaluating power demands corresponding to multiple consumers, e.g., to determine whether communities share any similar feature steps. Thus, rather than increasing the power demand placed on a utility, a consumer may receive energy from another consumer which has a current power demand greater than a corresponding target power demand. In another example, rather than unnecessarily using energy to maintain a stable current power demand, a consumer may offer excess power to other consumers to maintain their own stable current power demand.

Real-time analytics may be shared between the battery, the utility, the electrical devices, any alternative energy sources and the central processing unit. As a result, the entire system (consumer location, utility company, etc.) may be able to aggregate historical data in addition to any other external data sources which may impact energy generation and/or consumption. As a result, the central processing unit may continue to learn through a feedback loop of energy generation and energy consumption while also factoring in external aspects which may allow for energy consumption to be accurately predicted at any given time in order to stabilize the resulting power demand.

Thus, the central processing unit may choose a target power demand by learning and/or predictive analytics, user settings, etc., whereby the central processing unit operates to maintain power demand at the chosen target. Depending on the particular approach, targets may be set for any desired window of time. For instance, targets may be set for a day, several days, a week, weeks, a month, etc., at a time. However, a target power demand is preferably set for an amount of time that is reasonable in view of the available information, e.g., such as weather forecasting.

The central processing unit may also begin to learn the optimal interval for targets by minimizing the interval of change, which may be accomplished by minimizing peaks and troughs of power demand (e.g., energy consumption) intervals. As a result, a consumer location may be able to minimize the error between actual demand and target demand by predicting when power demand will rise above, or fall below, the target. This management in turn stabilizes the power demand placed on the utility. Moreover, when all external inputs to the system, including power demands from various electrical devices managed by the central processing unit, are held constant, the periodically measured error should desirably be monotone (not increasing), and may decrease asymptotically.

Figure 6:
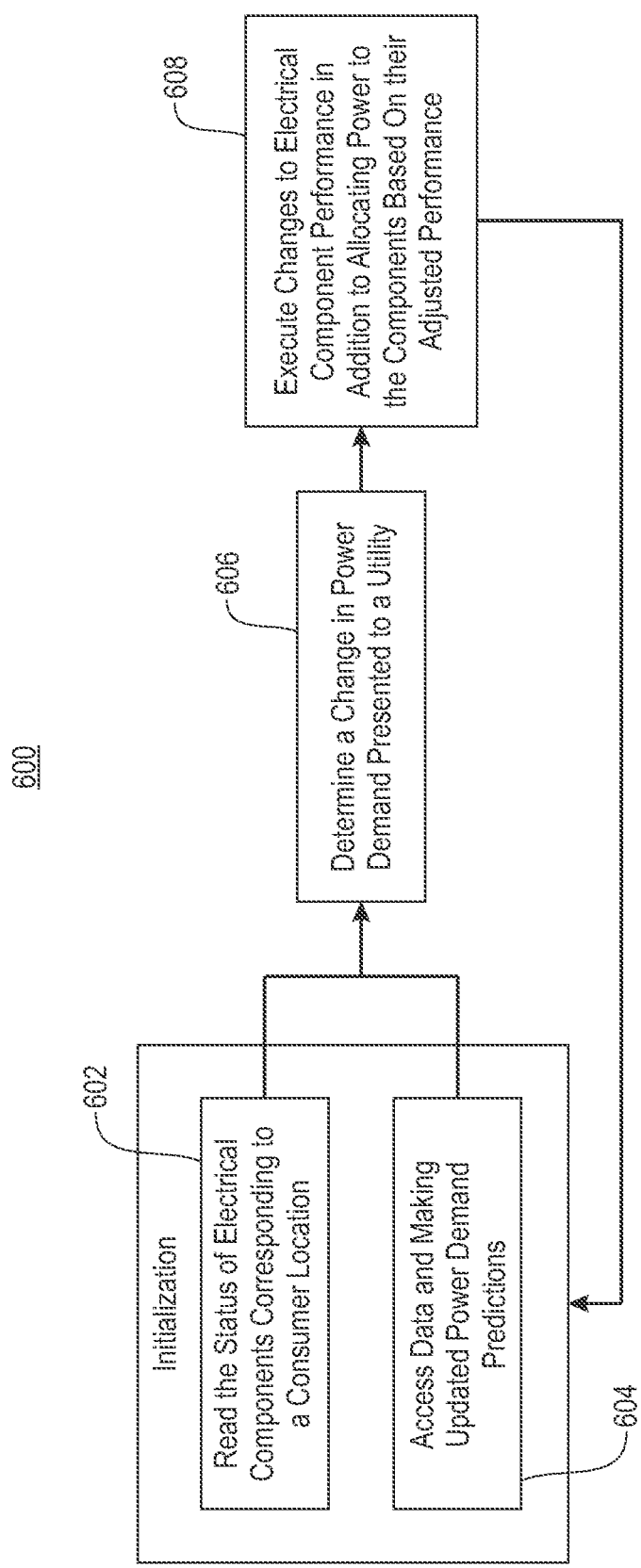
FIG. 6 is a flowchart of a method, in accordance with one embodiment.

Referring now to FIG. 6, a flowchart of a computer-implemented method 600 is shown according to one embodiment. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 of method 600 includes reading (e.g., determining) the status of IoT devices, batteries and/or alternative power sources corresponding to (e.g., coupled to a wired and/or wireless network at) a consumer location. Various electrical components corresponding to a given consumer may be read according to different approaches depending on the capabilities of the given electrical component. In some approaches, IoT compatible electrical components may communicate with (e.g., be read by) a processing unit performing one or more of the operations in method 600 via a wireless connection established therebetween. The processing unit (e.g., controller) may monitor and/or stabilize a power demand corresponding to the consumer by communicating with actuators that may control the power demand of the electrical components. For instance, the processing unit may use the average power demand as a target and charge a battery when the power demand fall below the average, thereby maintaining the power demand constant by leveraging the extra power that is available, but not necessarily needed by charging the battery rather than wasting it.

According to other approaches, a non-IoT compatible electrical component may communicate with the processing unit via an electrical outlet the electrical component is coupled to, where the electrical outlet is able to relay pertinent information regarding the electrical component (e.g., current/historical energy consumption, setting configurations of the component, etc.) to the processing unit. In still other approaches, more than one non-IoT compatible electrical devices may simply be grouped together and treated as an overall power load, where the corresponding power demand may be determined by reading a power meter corresponding to the consumer.

In some embodiments, the status of one or more of such components may be included as part of a profile corresponding to the respective component. Component profiles may be stored in memory, received upon initiating method 600, requested from each of the consumer components as a part of performing operation 602, etc. Accordingly, operation 604 includes accessing data and making updated power demand predictions. The "data" accessed may include any information included in component profiles, or any other information corresponding to any of the IoT devices, batteries and/or alternative power sources corresponding to the consumer location. According to various approaches, this data may include power demand history, component operating requirements, system settings, etc. Moreover, this data may be used to update power demand predictions corresponding to the consumer location, e.g., according to any of the approaches described herein.

It should also be noted that operations 602 and 604 are included in an overarching initialization process. This, both of operations 602 and 604 may be performed together (e.g., in parallel) each time method 600 is initiated and/or re-performed.

FIG. 6 further includes determining a change in power demand presented to a utility. See operation 606. Depending on the performance of various electrical components corresponding to a consumer, the power demand presented to a utility may change over time. However, a stable power demand is desirable. Therefore, the change in power demand determined in operation 606 is preferably used to adjust electrical component performance and/or a target power demand corresponding to the consumer. Accordingly, operation 608 includes executing changes to electrical component performance in addition to allocating power to the components based on their adjusted performance.

Electrical component performance may be changed according to any of the approaches described herein. Accordingly, electrical component performance may be increased in response to determining in operation 606 that overall power demand has decreased (e.g., below a target power demand). Alternatively, electrical component performance may be decreased in response to determining in operation 606 that overall power demand has increased (e.g., above a target power demand). The changes may be based on IoT profiles corresponding to each of the respective electrical components. Moreover, it is preferred that the changes executed in operation 608 are gradual in nature, e.g., to avoid causing the power demand to jump past a target. Accordingly, method 600 returns to operations 602 and 604 of the initialization process, whereby statuses of the electrical components may be re-read, and power demand predictions may be updated. It follows that method 600 may be performed periodically, upon receiving user input, preconfigured settings, depending on a result of the second process, etc.

As previously mentioned, a specified process for measuring the stability of power demand may be received from a utility. Therefore, determining an actual power demand corresponding to a consumer location may include measuring the power demand over a period of time in accordance with the specified process of measuring the stability of power demand received from the utility. According to an exemplary embodiment, which is in no way intended to limit the invention, power demand stability may be measured by the utility over a window of time by partitioning the window of time into a large sequence of contiguous smaller windows of time. Power consumption over each of the smaller windows may be measured, whereby the largest of such measurements may be designated as the peak power consumption period, while the smallest of such measurements is designated as the minimum power consumption period. Moreover, power consumption stability may be measured by calculating the difference between the peak and minimum measurements. Measuring power consumption stability as a difference between a peak power consumption and a minimum power consumption improves efficiency (e.g., increases revenue) for the utility. However, it should be noted that any other method of measuring power consumption stability may be implemented in various embodiments described herein, e.g., as would be appreciated by one skilled in the art after reading the present description.

It follows that various embodiments included herein are able to manage and stabilize energy consumption at a consumer location without implementing control of individual consumer locations by a utility. As described above, this may be achieved by interposing energy storage, periodic power-switching devices, and alternation-frequency modifying devices between specific energy consuming devices and the power demand presented by the consumer to the utility. Moreover, the interposed devices may be under the ultimate control of the consumer, the consumer being able to specify any device as not subject to power-switching or alternation-frequency change. Accordingly, some of the embodiments included herein use device demand change prediction to stabilize total consumer power demand.

Although power demands may also be reduced, this improvement in energy consumption stabilization may be achieved irrespective of power demand minimization at the consumer level. Thus, any of the approaches included herein may be implemented to improve the stability of energy demand on a nuclear level of one or more consumers, which may have IoT devices, independent energy sources having features which may be manipulated, an intelligent battery to store and/or distribute power, etc. Achieving machine-to-machine communication as described herein introduces the potential to improve efficiency for the allocation of energy within a complex power distribution system, e.g., such as an electrical grid. Energy consumption is an economic area that extends to every member of society, thereby providing energy companies the opportunity to implement tiered models to maximize profits, reduce energy losses and optimize generation. Moreover, these enhancements may be increased even further by incentivizing consumers to actively stabilize power demands.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    setting a target power demand corresponding to a consumer, wherein setting the target power demand is based on a reward table for rewarding stability of power demand, wherein the reward table is received from a utility;
    performing a process, the process including:
        determining an actual power demand presented to the utility by the consumer, wherein determining the actual power demand includes measuring the power demand over a period of time in accordance with a process for measuring stability of power demand received from the utility;
        determining a current error, wherein the current error is a difference between the actual power demand and the target power demand;
        determining whether the actual power demand is adjustable in a direction that reduces the current error;
        reducing the current error by adjusting the actual power demand in response to determining that the actual power demand is adjustable in the direction that reduces the current error; and
        modifying the target power demand in response to determining that the actual power demand is not adjustable in the direction that reduces the current error.

2. The computer-implemented method of claim 1, wherein reducing the current error by adjusting the actual power demand includes:
    setting an operating target based on the reward table and the process for measuring stability of power demand, wherein the operating target is a value between the actual power demand and the target power demand;
    performing a second process, the second process including:
        selecting an electrical device corresponding to the consumer;
        increasing a rate of electrical energy consumption corresponding to the selected device in response to determining that the current error has a negative value;
        decreasing the rate of electrical energy consumption corresponding to the selected device in response to determining that the current error has a positive value;
        determining whether an updated actual power demand has reached the operating target; and
    repeating the second process in response to determining that the updated actual power demand has not reached the operating target; and
    ending the second process in response to determining that the updated actual power demand has reached the operating target.

3. The computer-implemented method of claim 2, wherein the rate of electrical energy consumption corresponding to the selected device is changed by adjusting a frequency at which the electrical device is turned on and off.

4. The computer-implemented method of claim 2, wherein the rate of electrical energy consumption corresponding to the selected device is changed by adjusting a frequency of alternation for an alternating current supplied to the electrical device.

5. The computer-implemented method of claim 2, wherein an energy storage device is coupled to the selected device, wherein the energy storage device has a low power input and is configured to output energy at a higher power than the low power input.

6. The computer-implemented method of claim 5, wherein increasing and/or decreasing the rate of electrical energy consumption corresponding to the selected device includes adjusting an amount of electrical energy supplied to the selected device by the energy storage device.

7. The computer-implemented method of claim 5, wherein reducing the current error by adjusting the actual power demand includes adjusting a rate of electrical energy supplied to charge the energy storage device.

8. The computer-implemented method of claim 5, wherein the energy storage device includes a battery.

9. The computer-implemented method of claim 5, wherein the energy storage device is coupled to the utility and an independent energy source located locally, wherein the energy storage device is configured to accept electrical energy from the independent energy source and the utility concurrently.

10. The computer-implemented method of claim 1, comprising receiving a reward based on a correlation of a size of the current error over a period of time to a reward table.

11. A computer program product comprising a computer readable storage medium having program instructions embodied therewith, wherein the computer readable storage medium is not a transitory signal per se, the program instructions readable and/or executable by a processor to cause the processor to perform a method comprising:
setting, by the processor, a target power demand corresponding to a consumer, wherein setting the target power demand is based on a reward table for rewarding stability of power demand, wherein the reward table is received from a utility;
performing, by the processor, a process, the process including:
determining an actual power demand presented to the utility by the consumer, wherein determining the actual power demand includes measuring the power demand over a period of time in accordance with a process for measuring stability of power demand received from the utility;
determining a current error, wherein the current error is a difference between the actual power demand and the target power demand;
determining whether the actual power demand is adjustable in a direction that reduces the current error;
reducing the current error by adjusting the actual power demand in response to determining that the actual power demand is adjustable in the direction that reduces the current error; and
modifying the target power demand in response to determining that the actual power demand is not adjustable in the direction that reduces the current error.

12. The computer program product of claim 11, the program instructions readable and/or executable by the processor to cause the processor to perform the method comprising:
setting, by the processor, an operating target based on the reward table and the process for measuring stability of power demand, wherein the operating target is a value between the actual power demand and the target power demand;
performing, by the processor, a second process, the second process including:
selecting an electrical device corresponding to the consumer;
increasing a rate of electrical energy consumption corresponding to the selected device in response to determining that the current error has a negative value;
decreasing the rate of electrical energy consumption corresponding to the selected device in response to determining that the current error has a positive value;
determining whether an updated actual power demand has reached the operating target; and
repeating, by the processor, the second process in response to determining that the updated actual power demand has not reached the operating target; and
ending, by the processor, the second process in response to determining that the updated actual power demand has reached the operating target.

13. The computer program product of claim 12, wherein the rate of electrical energy consumption corresponding to the selected device is changed by adjusting a frequency at which the electrical device is turned on and off, and/or by adjusting a frequency of alteration for an alternating current supplied to the electrical device.

14. The computer program product of claim 12, wherein an energy storage device is coupled to the selected device, wherein the energy storage device has a low power input and is configured to output energy at a higher power than the low power input.

15. The computer program product of claim 14, wherein increasing and/or decreasing the rate of electrical energy consumption corresponding to the selected device includes adjusting an amount of electrical energy supplied to the selected device by the energy storage device.

16. The computer program product of claim 14, wherein reducing the current error by adjusting the actual power demand includes adjusting a rate of electrical energy supplied to charge the energy storage device.

17. The computer program product of claim 14, wherein the energy storage device includes a battery.

18. The computer program product of claim 14, wherein the energy storage device is coupled to the utility and an independent energy source located locally, wherein the energy storage device is configured to accept electrical energy from the independent energy source and the utility concurrently.

19. The computer program product of claim 11, comprising receiving a reward based on a correlation of a size of the current error over a period of time to a reward table.

20. A system, comprising:
a processor; and
logic integrated with the processor, executable by the processor, or integrated with and executable by the processor, the logic being configured to:
set a target power demand corresponding to a consumer, wherein setting the target power demand is based on a reward table for rewarding stability of power demand, wherein the reward table is received from a utility;
perform a process, the process including:
determining an actual power demand presented to the utility by the consumer, wherein determining the actual power demand includes measuring the power demand over a period of time in accordance with a process for measuring stability of power demand received from the utility;
determining a current error, wherein the current error is a difference between the actual power demand and the target power demand;

determining whether the actual power demand is adjustable in a direction that reduces the current error;

reducing the current error by adjusting the actual power demand in response to determining that the actual power demand is adjustable in the direction that reduces the current error; and modifying the target power demand in response to determining that the actual power demand is not adjustable in the direction that reduces the current error.

\* \* \* \* \*